United States Patent [19]
Prager et al.

[11] Patent Number: 5,694,309
[45] Date of Patent: Dec. 2, 1997

[54] SYNCHRONIZATION OF POWER CONVERTER ARRAYS

[75] Inventors: Jay Prager, Tyngsboro; Patrizio Vinciarelli, Boston, both of Mass.

[73] Assignee: VLT Corporation, San Antonio, Tex.

[21] Appl. No.: 631,890

[22] Filed: Apr. 16, 1996

[51] Int. Cl.[6] .................................................. H02M 7/00
[52] U.S. Cl. .................................................. 363/65; 361/330
[58] Field of Search ................................. 363/65; 361/330

[56] References Cited

U.S. PATENT DOCUMENTS

| | | | |
|---|---|---|---|
| 2,703,857 | 3/1955 | Engelhardt et al. | 361/323 |
| 3,123,765 | 3/1964 | Julie | 323/370 |
| 3,483,453 | 12/1969 | Meyers | 361/330 |
| 4,194,147 | 3/1980 | Payne et al. | 323/272 |
| 4,371,919 | 2/1983 | Andrews et al. | 363/65 |
| 4,415,959 | 11/1983 | Vinciarelli | 363/21 |
| 4,425,613 | 1/1984 | Shelly | 363/71 |
| 4,455,545 | 6/1984 | Shelly | 336/200 |
| 4,648,020 | 3/1987 | Vinciarelli | 363/71 |
| 4,675,797 | 6/1987 | Vinciarelli | 363/21 |
| 4,695,933 | 9/1987 | Nguyen et al. | 363/71 |
| 4,783,728 | 11/1988 | Hoffman | 363/71 |
| 4,924,170 | 5/1990 | Henze | 363/71 |
| 4,945,462 | 7/1990 | Lieberman | 363/17 |
| 4,964,028 | 10/1990 | Spataro | 363/21 |
| 5,079,686 | 1/1992 | Vinciarelli | 363/15 |
| 5,245,525 | 9/1993 | Galloway et al. | 363/65 |
| 5,274,539 | 12/1993 | Steigerwald et al. | 363/65 |
| 5,546,065 | 8/1996 | Vinciarelli et al. | 336/84 |

OTHER PUBLICATIONS

AVX Corporation, Myrtle Beach, CA, Catalog, 1995, p. 52.
Vicor Products Catalog, Zero–Current Switching Conversion Products, Jun. 1988.

*Primary Examiner*—Stuart N. Hecker
*Attorney, Agent, or Firm*—Fish & Richardson P.C.

[57] ABSTRACT

A power conversion array delivers power to a load. The array includes at least four power converters, each of the power converters comprising an output power port for connection to the load and a synchronization port for passing synchronization information. A synchronization medium connected to the synchronization ports of the converters carries the synchronization information among the converters. The synchronization medium defines paths among the synchronization ports such that every synchronization port is connected to every other synchronization port by at least one path that does not include a connection to the synchronization port of any of the other converters. In another aspect, in arrays which include at least three power converters, the synchronizing medium conveys synchronizing information via impedance elements connected to the synchronization ports by coupling conductors, and the path between any pair of coupling conductors includes exactly two impedance elements. In another aspect, an integral assembly includes impedance devices, each of which is formed by an element that is specific to that device and a common element that is shared by the devices, and a mechanism (e.g., insulation) that prevents exposure of the common element to the environment.

40 Claims, 17 Drawing Sheets

TOTAL #CAPACITORS $= \sum_{m=1}^{N-1}(N-m) = \frac{N(N-1)}{2}$

SYNCHRONIZATION OF POWER CONVERTER ARRAYS

BACKGROUND

This invention relates to synchronization of power converter arrays.

Known arrays of DC-DC zero-current switching converters (such as those described in Vinciarelli, U.S. Pat. No. 4,648,020, incorporated by reference) exploit the pulse by pulse energy quantization inherent in zero-current switching converters as a mechanism for power sharing by the converters in the array. In some such arrays, energy transfer cycles in one or more zero-current switching booster modules, each of which includes a zero-current switching converter, are synchronously triggered at a frequency which is controlled by a master controller.

In one scheme, the master controller is part of a zero-current switching driver module, which includes both a zero-current switching converter and the master controller. An output of the driver module adjusts the operating frequency of the array to maintain the load voltage at a desired (setpoint) value. The zero-current switching converters in the driver and booster modules are characterized by an effective inductance (L) and a capacitance (C) which define a characteristic time scale, pi*sqrt(L*C), for the energy transfer cycle. If the characteristic time scales for all of the converters in the array are essentially equal, each converter module in the array will deliver an essentially constant fraction of the total power delivered to the load. Arrays of this kind permit modular power expansion while eliminating many of the drawbacks associated with alternative approaches (e.g., beat frequencies associated with arrays of unsynchronized converters; and saturated operation of converters in arrays which do not inherently share power).

In the described array the driver incorporates the "intelligence" required to perform load voltage regulation and to communicate synchronizing information unidirectionally to the boosters. The boosters receive synchronizing information from, and augment the power handling capability of, the driver, but cannot, by themselves, perform load voltage regulation. This asymmetry in structure and operation is apparent in the behavior of the described array under fault conditions. Under these conditions, any of the booster modules can cease to deliver power without interrupting the operation of the array (provided that the power drawn by the load does not exceed the sum of the power ratings of the remaining modules which comprise the array). However, a failure of the driver module will compromise the operation of the entire array.

In another scheme described in U.S. Pat. No. 4,648,020, an array is formed of identical booster modules all controlled by a single phase shifting controller.

U.S. Pat. No. 5,079,686, "Enhancement Mode Zero-Current Switching Converter," incorporated by reference, describes an enhancement-mode converter module and power sharing arrays comprised of such modules. The enhancement-mode converter module includes a zero-current switching converter, an enhancement-mode controller, and an input-output port for carrying synchronizing information to and from an external synchronizing bus. The enhancement mode controller adjusts the frequency at which energy transfer cycles are triggered in the zero-current switching converter to be the greater of a first frequency, which will regulate the load voltage to a setpoint voltage, Vsp, characteristic of the enhancement-mode controller, or a second frequency, which is indicated by an input delivered to the input-output port.

An array of such enhancement mode converter modules 10 is shown in FIG. 1. The outputs of all of the enhancement-mode converter modules 100a, 100b, . . . , 100n are connected together to deliver power to a load. Synchronizing information, carried to a synchronizing bus 150 by the input-output port 36a, 36b, . . . , 36n of any of the converter modules, is delivered as an input to the input-output ports of the other converter modules by propagation along the synchronizing bus. All of the converter modules then will synchronize to an operating frequency determined by the enhancement-mode controller having the highest setpoint voltage, Vspa, Vspb, . . . , Vspn. Each of the converter modules will deliver an essentially constant fraction of the total power delivered to the load 200 by the array.

If the enhancement-mode controllers included in each of the enhancement-mode converter modules within the array are characterized by a setpoint voltage which is within a defined tolerance band relative to some nominal setpoint voltage value, Vspx, then the output voltage of the array will also fall within the defined tolerance band relative to the nominal setpoint voltage value, Vspx. The array is fault-tolerant in that failure of any one, or several, of the enhancement-mode converter modules comprising the array, or failure of any one, or several, of the elements which comprise the synchronizing bus, will not interrupt delivery of power to, or regulation of voltage at, the load.

Several companies manufacture capacitor networks. For example AVX Corporation, Myrtle Beach, Calif., USA, manufactures capacitor networks in SIP packages. Such capacitor networks are characterized in that they provide externally accessible connection points (pins) to both ends of the capacitors, including the common connection point between the capacitors in the networks.

SUMMARY

In general, in one aspect, the invention features a power conversion array for delivering power to a load. The array includes at least four power converters, each of the power converters comprising an output power port for connection to the load and a synchronization port for passing synchronization information. A synchronization medium connected to the synchronization ports of the converters carries the synchronization information among the converters. The synchronization medium defines paths among the synchronization ports such that every synchronization port is connected to every other synchronization port by at least one path that does not include a connection to the synchronization port of any of the other converters.

Implementations of the invention may include one or more of the following features. The one path may be a galvanically isolated region coupled by an electromagnetic field, and may include capacitive or inductive impedance coupling. The capacitive coupling in the one path may be a capacitor. Capacitors may connect each of the synchronization ports to every other synchronization port. The synchronization medium may be connected to each of the ports using conductors which comprise windings and the paths may include magnetic coupling. The conductors may enclose a magnetically permeable medium, e.g., a core. The conductors and the permeable medium may comprise a leakage inductance transformer. The permeable medium may include two stacked core pieces. The synchronization medium may include insulated conductors (e.g., twisted together wires) that are connected respectively to the synchronization ports of the power converters and are capacitively coupled to one another. The impedance coupling may include impedances formed as an integrated device. The impedance coupling may include resistors, active components, or JFETs.

In general, in another aspect, the invention features a power conversion array, including at least three power converters, in which the synchronizing medium conveys synchronizing information via impedance elements connected to the synchronization ports by coupling conductors, and the path between any pair of coupling conductors includes exactly two impedance elements.

Implementations of the invention may include one or more of the following. The two impedance elements may include capacitive elements connected in series between the pair of ports. The synchronizing medium may include one capacitor for each converter in the array, one terminal of each capacitor being a coupling conductor connected to a different synchronization port in the array, the other terminals of all of the capacitors being connected together. The capacitive elements may include metal tabs which are capacitively coupled to a single conductive element. The single conductive element may be a conductive plate that is insulated from the environment; the plate may be folded.

The converters may be zcs converters or enhancement-mode converters, some of them booster converters. The converters may include regenerative synchronization circuitry or talker-listener synchronization circuitry.

In general, in another aspect, the invention features an integral assembly including impedance devices, each of which is formed by an element that is specific to that device and a common element that is shared by the devices, and a mechanism (e.g., insulation) that prevents exposure of the common element to the environment.

DESCRIPTION

DESCRIPTION OF THE PREFERRED EMBODIMENTS

Figure 1:
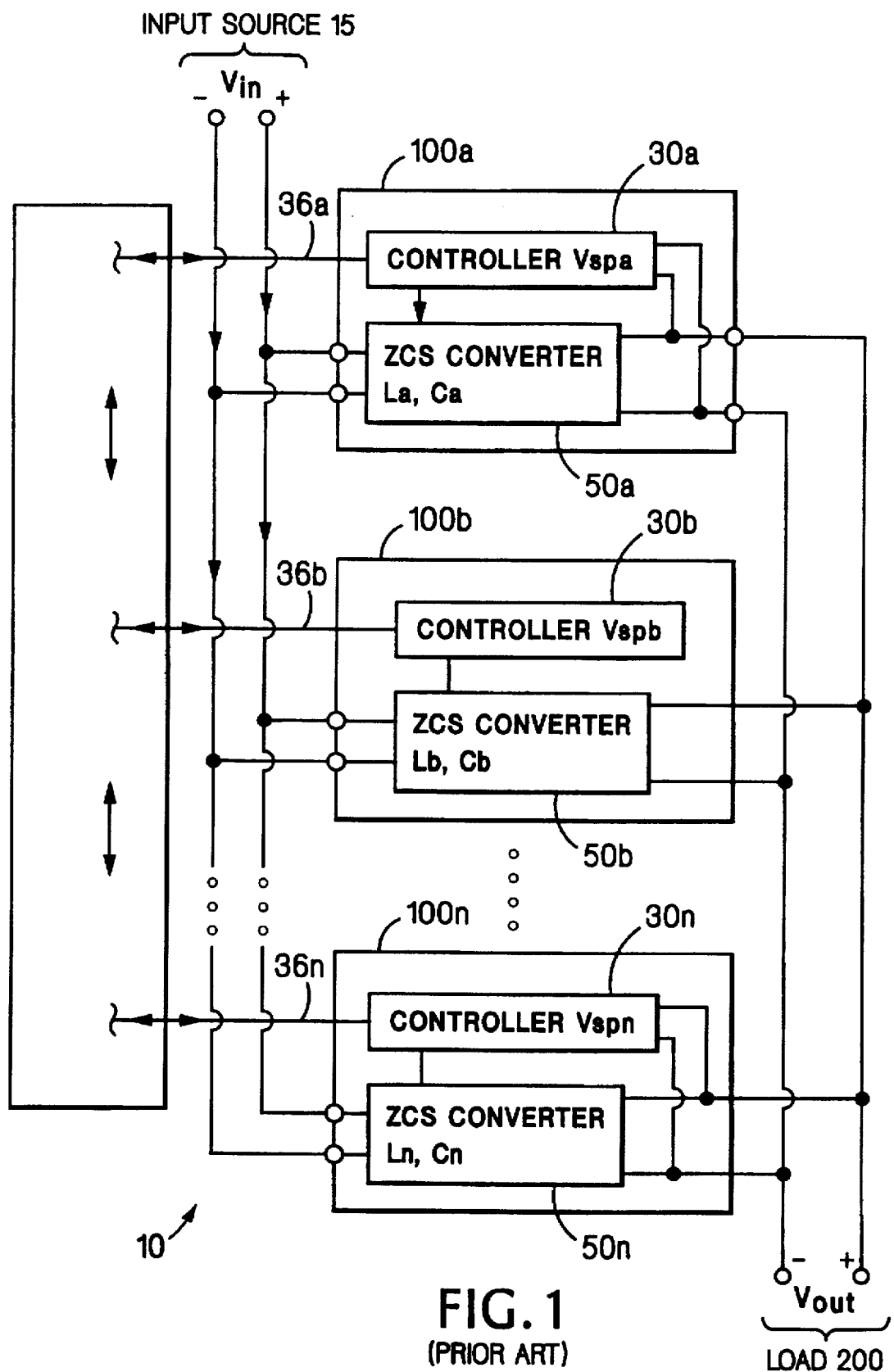
FIG. 1 is a block diagram of an array of enhancement-mode converters.
Figure 2:
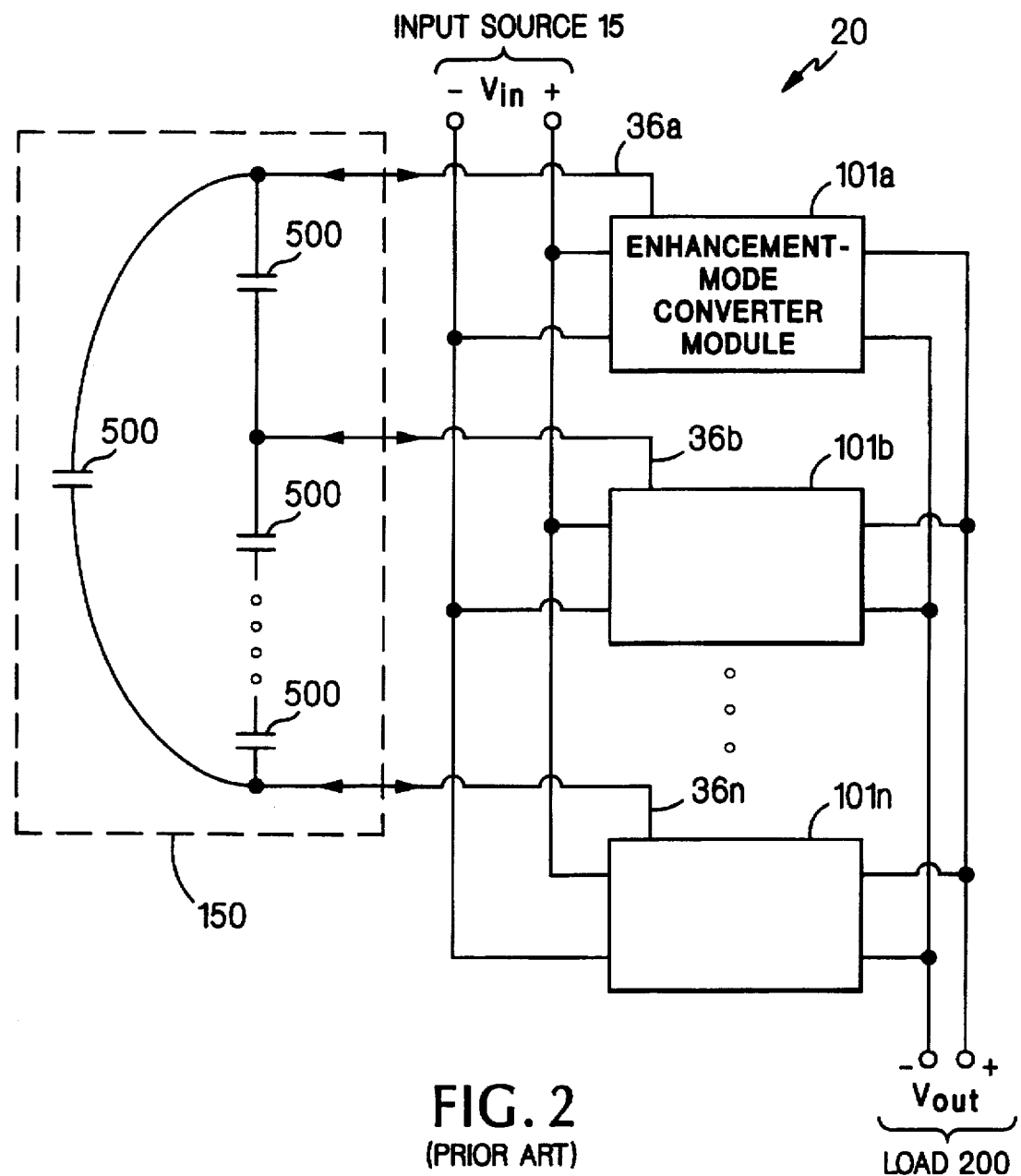
FIG. 2 is a block diagram of an array of enhancement-mode converters showing a synchronizing bus embodiment.

FIG. 2 shows an embodiment of an array 20 of enhancement-mode power converters $100a, 100b, \ldots, 100n$ ("converters") as described in U.S. Pat. No. 5,079,686 (the "enhancement patent"). In synchronizing bus 150, the input-output port $36a, 36b, \ldots, 36n$ of each module is connected by capacitors 500 to the input-output ports of two other modules. As explained in the enhancement patent, all of the converters are, in general, identical and all are able to act as the array master (i.e., the converter which sets the operating frequency of the array). Under steady-state operating conditions, one converter in the array will act as the master and the others will act as boosters (e.g., modules which synchronize to the operating frequency set by the array master). Arrays of the kind shown in FIG. 2 are fault-tolerant in that single-point bus faults will not cause the synchronized, power-sharing, attributes of the array to be compromised (provided that there are enough operational modules remaining in the array to support the power drawn by the load).

The input-output circuitry used in the converters $100a, \ldots, 100n$ of FIG. 2 is described in the enhancement patent as being of the "regenerative" type (i.e., the input-output circuitry actively drives the synchronizing bus via the converter's input-output port each time an operating cycle is triggered within the converter, irrespective of whether the converter is acting as a master or a booster).

Another form of input-output circuitry is "talker-listener" circuitry. In an array of converters incorporating talker-listener circuitry only the master converter "talks" by delivering synchronizing information (e.g., synchronizing pulses) to the bus. The rest of the converters are in a "listener" mode in which they receive synchronizing information generated by the master.

Figure 3:
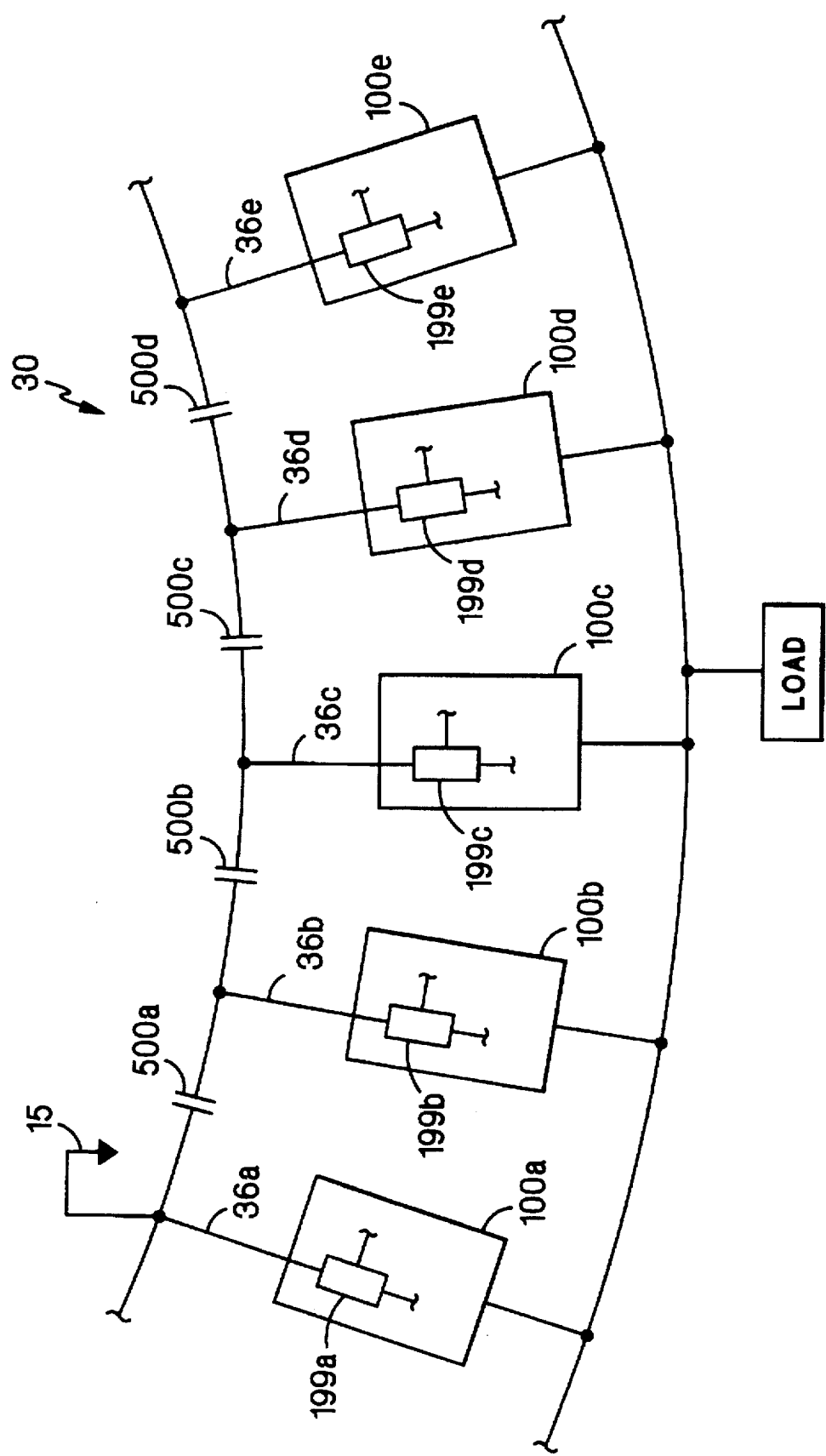
FIG. 3 shows the array of FIG. 2 with a bus fault.

As a practical matter, if the converters in an array of the kind shown in FIG. 2 do not include "regenerative" input-output circuitry then there is a limit to the number of converters which can be combined to form a fault tolerant array. This is explained with reference to FIG. 3, in which a short-circuit 15 across the input-output port $36a$ of converter $100a$ causes capacitor $500a$ to bypass the input-output port $36b$ of converter $100b$ to ground. Under this circumstance, if converter modules $100a, 100b, \ldots, 100e$ incorporate talker-listener circuitry $199a, \ldots, 199e$ and converter $100c$ is the array master, the signal level at port $36b$ will be reduced to one-half of the signal level generated by converter $100c$ owing to the capacitive divider formed by capacitors $500a$ and $500b$ (for simplicity, in this and all subsequent examples of this type, it will be assumed that the impedance of the input-output port is high enough to allow it to be neglected). Likewise, if converter $100d$ were the master, the signal level at port $36b$ would be reduced by a factor of three; if converter $100e$ were the master, the signal level at port 36b would be reduced by a factor of four. For an array of N converters to be fault tolerant, the signal level generated by the master would have to be at least N times greater than the receiver threshold of the talker-listener circuitry. For all but very small arrays, this would require that either a relatively high signal level be generated by the master or that the receive threshold of the input-output circuitry be set to a relatively low level, neither of which is desirable from the viewpoints of circuit complexity or noise sensitivity. On the other hand, if converters incorporating regenerative circuitry are used in the array, the signal will be regenerated at each input-output port and the received signal level will never be attenuated by more than a factor of two.

Figure 4:
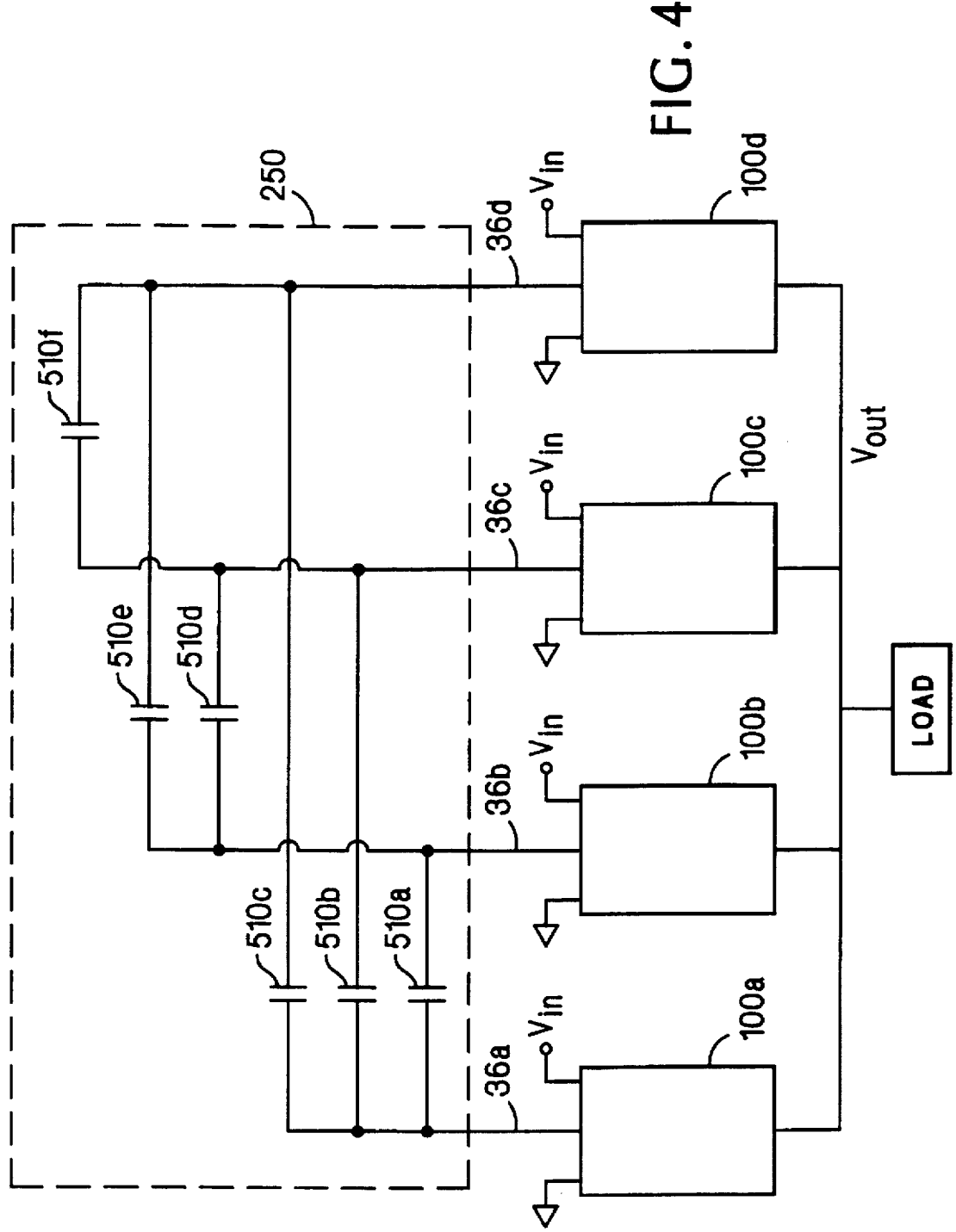
FIG. 4 is a block diagram of an array of four enhancement-mode converters with a synchronizing bus.

A synchronizing bus which is not limited to use with converters having regenerative input-output port circuitry is illustrated in FIG. 4. The synchronizing bus 250 includes capacitors 510a, ..., 510f connected such that a capacitor is connected between the input-output port 36a, ..., 36d of each converter 100a, ..., 100d and the input-output port of each other converter in the array. This is in contrast to the bus 150 structure of FIG. 2 in which capacitors are connected between the input-output ports of each converter and the input-output ports of only two other converters.

Figure 5:
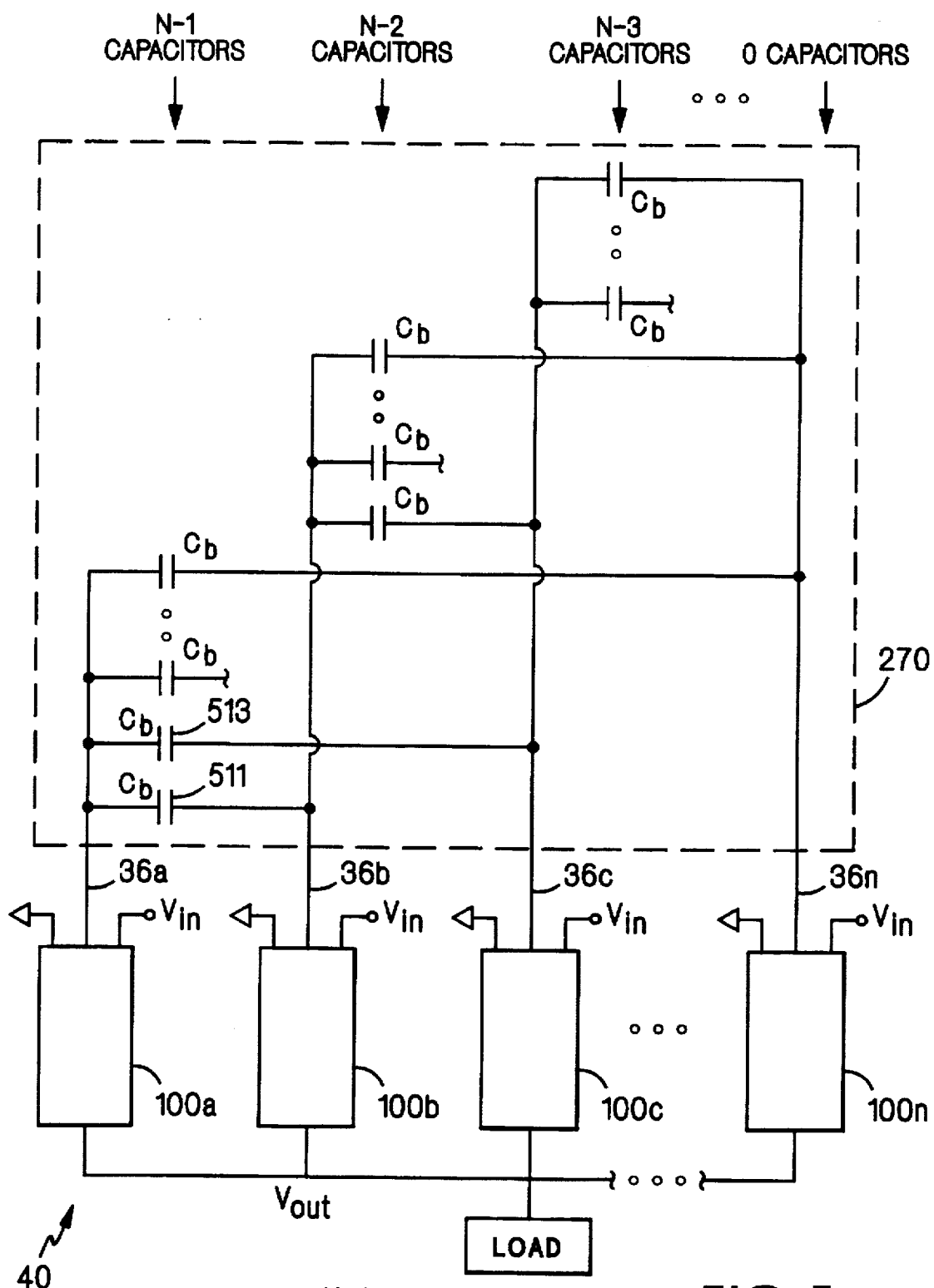
FIG. 5 is a block diagram showing the application of the synchronizing bus embodiment of FIG. 4 to an array of N enhancement-mode converters.

As illustrated in FIG. 5, the synchronizing bus structure 250 of FIG. 4 may be expanded to arrays of any size. In the Figure, which illustrates an array of N converters 40, all of the capacitors used in the synchronizing bus 270 are labeled "Cb." To connect the input-output port 36a of converter 100a to the input-output ports of the remaining N−1 converters in the array requires a first group of (N−1) capacitors. To connect the input-output port 36b of converter 100b to the input-output ports of the remaining N−1 converters in the array requires a second group of only (N−2) additional capacitors, since capacitor 511, included in the first group of capacitors, already connects port 36a to port 36b. Likewise, the number of additional capacitors required to connect port 36c to all other converter ports equals (N−3), and so on. In general, then, as shown in the Figure, a total of at least N*(N−1)/2 capacitors is required to interconnect the input-output ports of each converter in an array of N converters to each input-output port of every other converter in the array 40.

Figure 6:
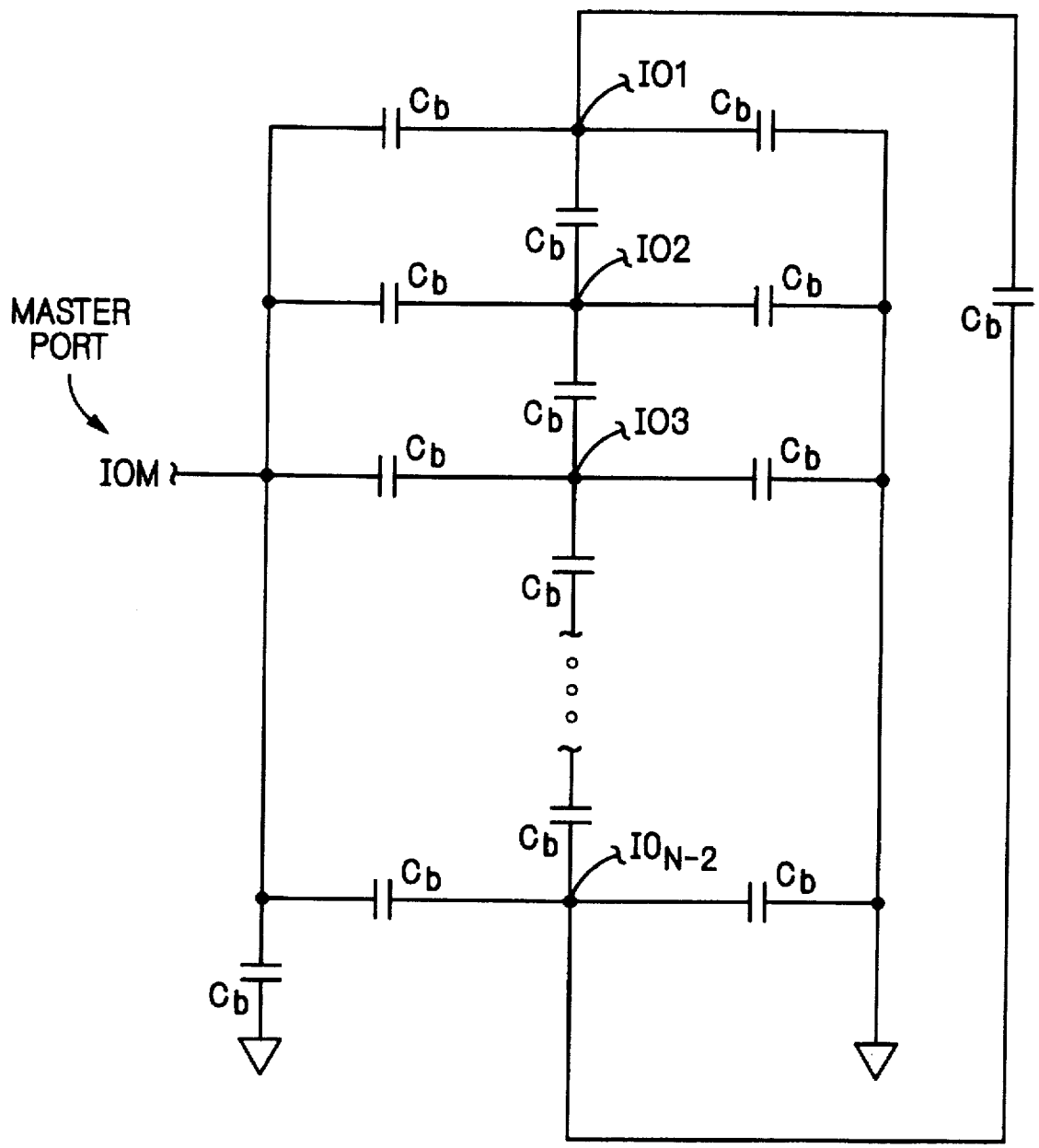
FIG. 6 is a circuit model of the bus of FIG. 5 under a fault condition.

If, in the array of FIG. 5, a short circuit develops between any converter input-output port and a ground-referenced point common to the port, then the equivalent impedance reflected across the input-output port of the master converter will be as shown in FIG. 6. The ground symbol represents the grounded input-output port of the shorted converter. The input-output port of the master converter is labeled IOM and the ports of the remainder of the (booster) converters are labeled IO1, IO2, ..., IOn−2. It can be shown that the signal present at each of the ports IO1 through IOn−2 is equal to one-half of the signal presented by the master converter to port IOM, and that capacitive loading on the master port equals N*Cb/2 farads.

Figure 7:
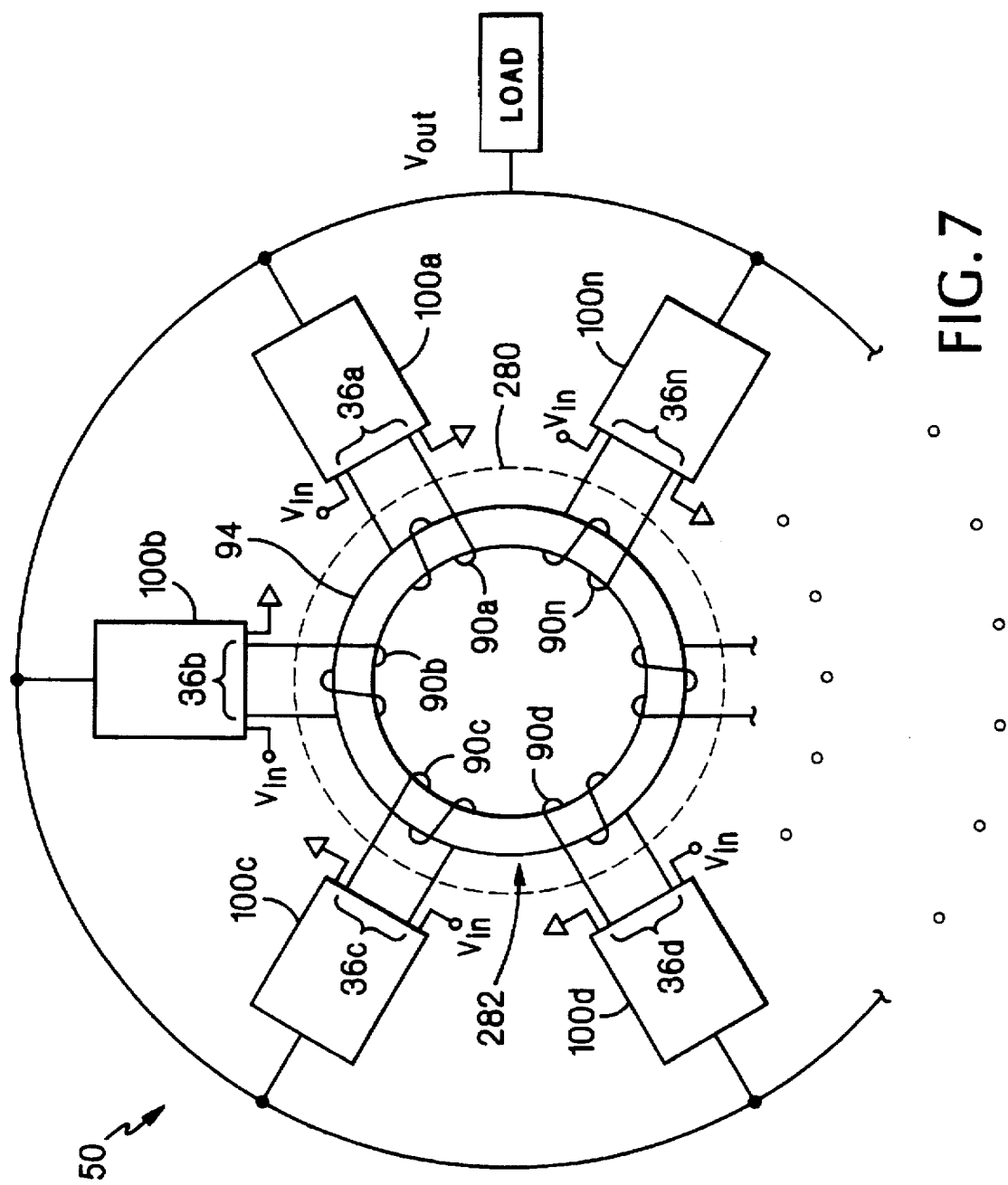
FIG. 7 is a block diagram of an array of enhancement-mode converters with an alternate synchronizing bus.
Figure 8:
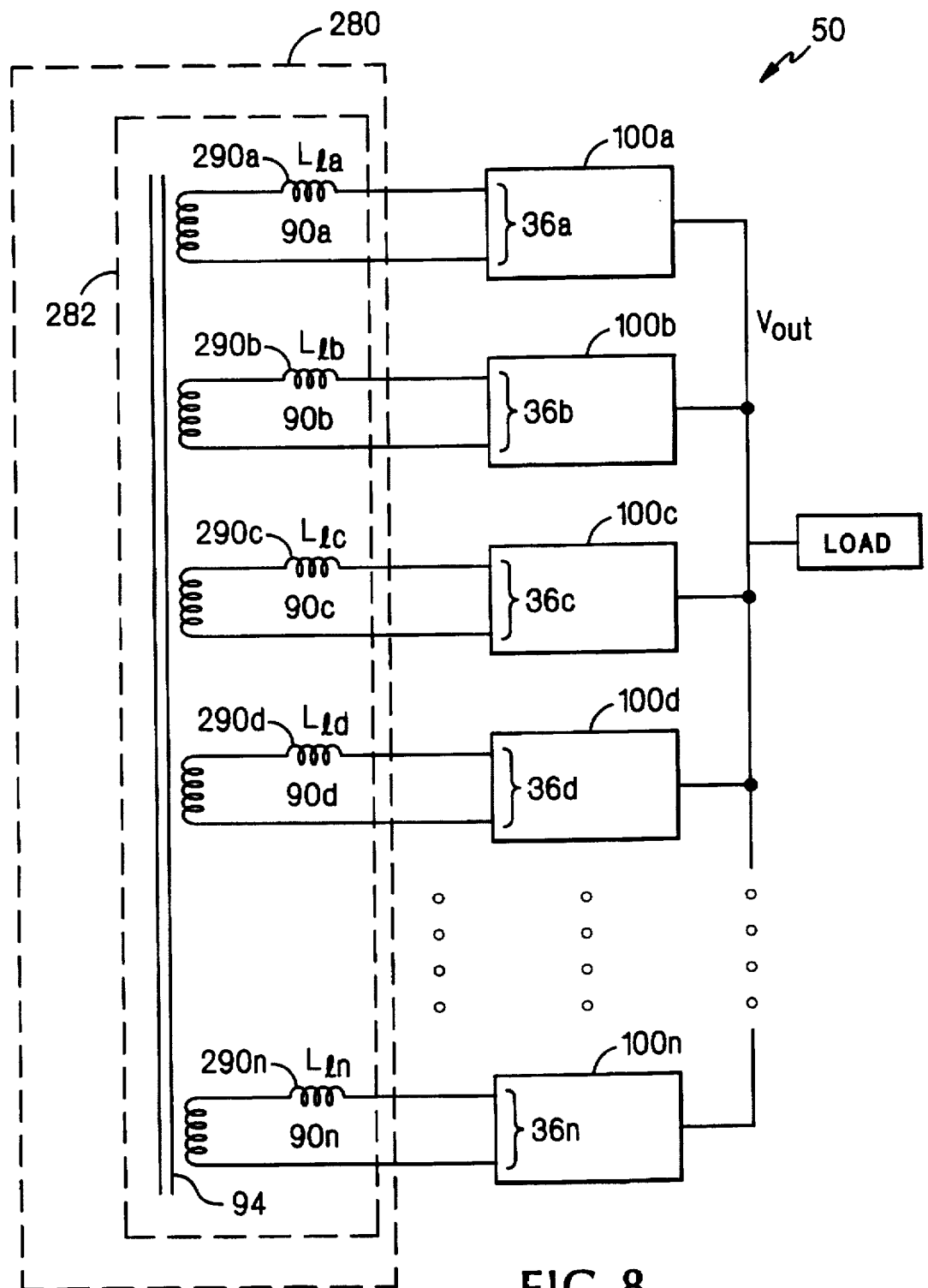
FIG. 8 is a schematic diagram of the array and synchronizing bus of FIG. 7.

FIG. 7 illustrates another synchronizing bus 280 which uses a similar principle. Bus 280 includes a leakage inductance transformer 282 (i.e., a transformer in which the coupling between windings is controlled to provide predetermined amounts of leakage inductance at each winding) consisting of N windings 90a, 90b, ..., 90n linked by a permeable magnetic core 94. The windings 90a, 90b, ..., 90n connect to the input-output ports 36a, 36b, ..., 36n of N converters 100a, 100b, ..., 100n to form the array 50. A schematic representation of the transformer is shown in FIG. 8. Each winding 90a, 90b, ..., 90n is shown to have an associated leakage inductance 290a, 290b, ..., 290n of respective values Lla, Llb, ..., Lln. In operation, the permeable magnetic medium 94 links each winding with all other windings so that a signal (e.g., a pulse) injected into one winding is delivered to all. Should an input-output port become short-circuited, the leakage inductance of the winding connected to the port will be reflected as an inductive impedance across the winding, thereby preventing the short circuit from being reflected into the other windings.

Delivery of synchronizing information to every input-output port 36a, 36b, ..., 36n by magnetic coupling in the leakage inductance transformer 282 in the synchronizing bus 280 of FIG. 7 is analogous to delivery of synchronizing information to all input-output ports 36a, 36b, ..., 36n in the synchronizing bus 270 of FIG. 5 by the capacitive coupling provided by the capacitors, Cb. Both buses also provide galvanic isolation between input-output ports, thereby preventing DC voltages (e.g., due to a short circuit from the input-output port to either a source of DC voltage, such as the input voltage source, Vin, or to ground) from propagating as faults along the bus.

One benefit of the bus of FIG. 7 is that, by providing essentially complete isolation between all of the converter input-output ports (i.e., both the port signal inputs and the signal returns are isolated), it eliminates problems associated with the formation of "ground loops." Another benefit of complete isolation between input-output ports is the degree of flexibility which it affords in configuring arrays.

Figure 9:
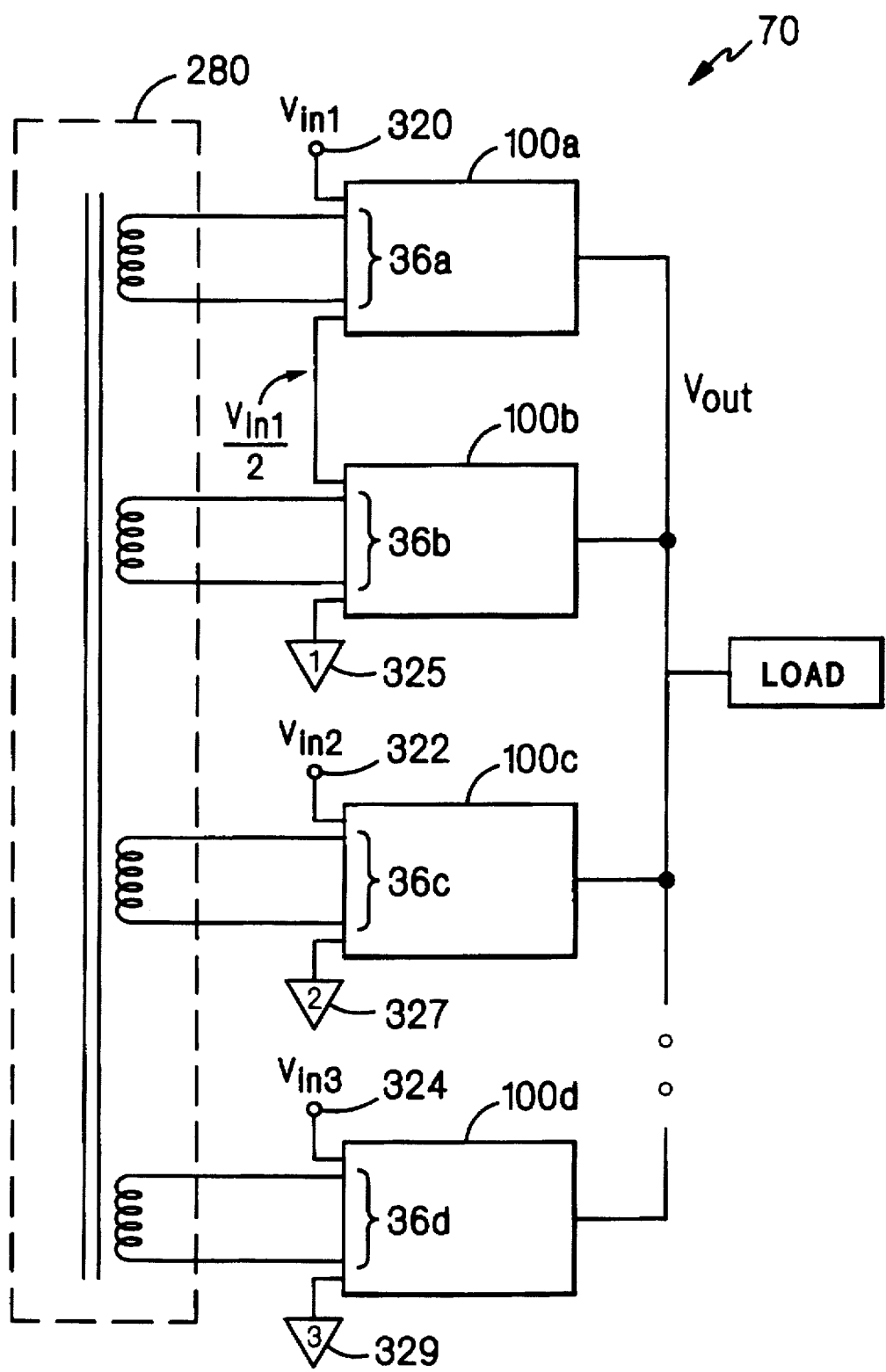
FIG. 9 is an array using a synchronizing bus of the kind shown in FIG. 7.

For example, FIG. 9 shows an array of four converters 100a, ..., 100d, linked by a synchronizing bus 280 of the kind shown in FIG. 7, in which the converters operate from three completely independent input sources of values Vin1 320, Vin2 322 and Vin3 324, having three independent and isolated ground returns, 325, 327, 329, respectively. Converters 101c and 101d derive their input power from independent sources 322 and 324, respectively, whereas the voltage inputs of converters 100a, 100b are connected in series to the input source 320, such that each converter has a nominal input voltage equal to Vin/2. Because of the complete isolation between converter input-output ports 36a, ..., 36d provided by the magnetically coupled synchronizing bus 280, arrays comprising series connected modules 101c and 101d and multiple independent input sources can be constructed without difficulty.

One way to construct a capacitively coupled synchronizing bus of the kind shown in FIG. 5 is to use an appropriate number of discrete two-terminal capacitors. In a typical array of zero-current switching converters the synchronizing signals might be pulses, on the order of 100 nanoseconds in duration, having an amplitude on the order of 10 volts. The value of the synchronizing bus capacitors, Cb, might be on the order of 100 picofarads. For applications powered by rectified AC utility lines, where DC voltages on the order of 400 V could be encountered, a capacitor voltage rating of at least 500 VDC would be appropriate (to withstand bus faults to the input source). Small capacitors of various dielectric types (e.g., ceramic, film) with these ratings are readily available from many manufacturers. One benefit of discrete capacitors is that they can be used to construct synchronizing buses 270 of any size. Among the drawbacks associated with using discrete capacitors are the need to handle and install many individual components.

Figure 10:
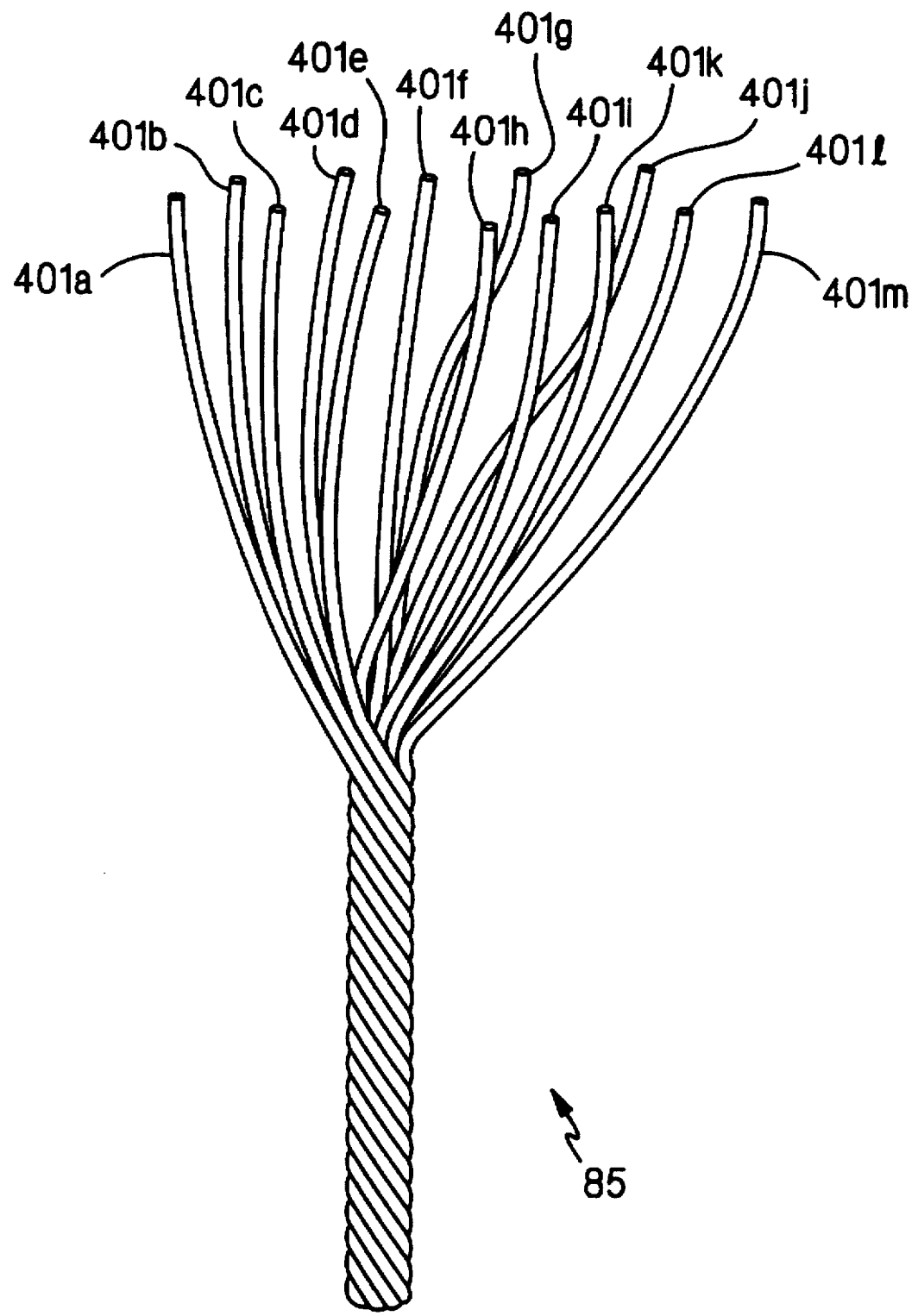
FIG. 10 shows an embodiment of a synchronizing bus of the kind shown in FIG. 5.

An alternative to using discrete capacitors is shown in FIG. 10, in which a capacitively coupled structure 85 is formed by randomly twisting insulated wires 401a, ..., 401m into a bundle. In the bundle, each wire is capacitively coupled to all other wires because of their close physical proximity. In application in the array of FIG. 5, one of the wires 401a, . . . , 401m would be connected to each input-output port of each converter in the array 270. While such a capacitive coupler 85 is inexpensive, it is somewhat bulky if constructed of ordinary insulated wire (because of the relatively low dielectric constant of ordinary insulations). For example, a bundle of several #30 AWG wires, having a conductor diameter of 0.010 inch and a plastic insulation of 0.005 inch thickness, exhibits a capacitance of 3.3 picofarads per inch between conductors. A bundle of approximately thirty inches in length would therefore be required to achieve 100 picofarads between ports. On the other hand, the bundle could be folded into a relatively small volume or wires having insulation with a relatively higher dielectric constant could be used.

Figure 11A:
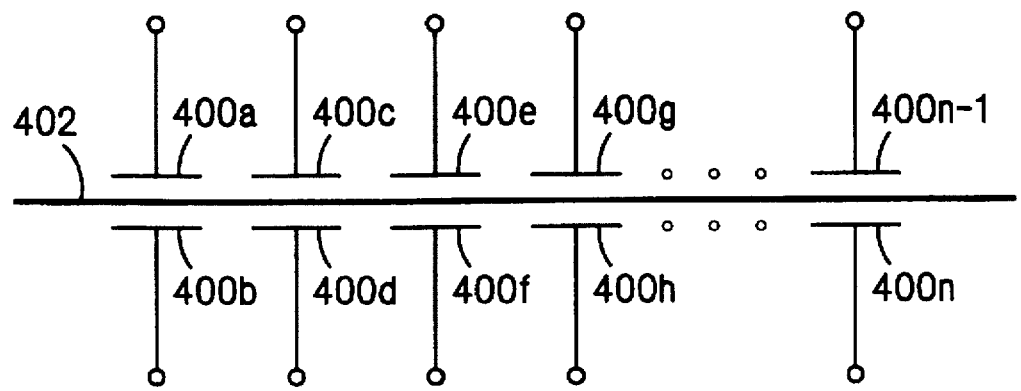
FIG. 11A is a diagram showing a structure for use in constructing a capacitively coupled synchronizing bus of the kind shown in FIG. 5.
Figure 12B:
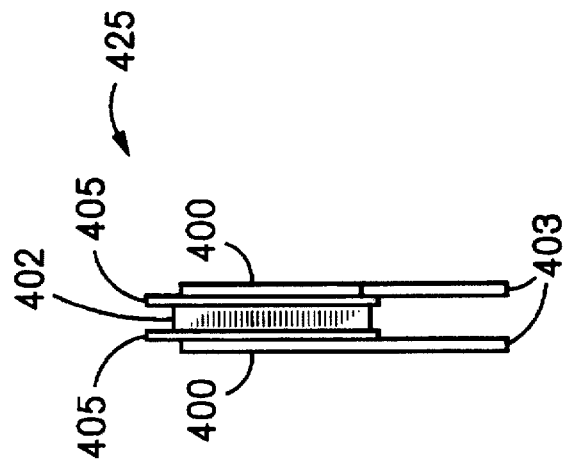
FIGS. 12A and 12B show side and end views of the internal construction of the structure of FIG. 11.
Figure 12C:
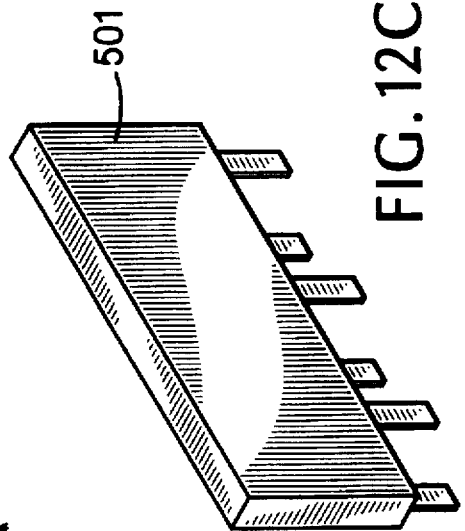
FIG. 12C shows a perspective view of a finished version of the structure shown in FIGS. 12A and 12B..
Figure 12A:
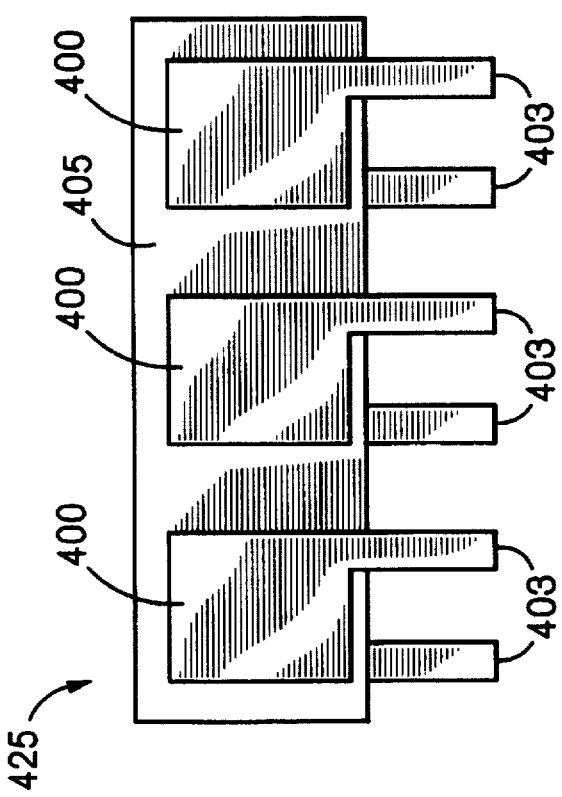

FIG. 11A shows a schematic of another capacitively coupled structure 410, in which conductive plates 400a, . . . , 400n are capacitively coupled to each other via the medium of a single conductive element 402. For example, in one such structure 425, the internal construction of which is shown in FIGS. 12A and 12B, several conductive tabs 400 are separated by insulating sheets 405 from both surfaces of a conductive plate 402. Extension legs 403, which form part of the tabs 400, are used to make electrical connections between the structure 425 and the input-output ports of converters (e.g., by inserting the legs into holes in a printed circuit board). The assembly 425 is finished by applying an insulating medium 501, such as a case or an overmolding compound, around the exterior surfaces, while leaving the tabs accessible for connection (FIG. 12C). The port-to-port capacitance, Cb, is determined by the dielectric constant of the insulating sheets 405 and the area of overlap between the tabs and plate 400, 402.

Figure 13:
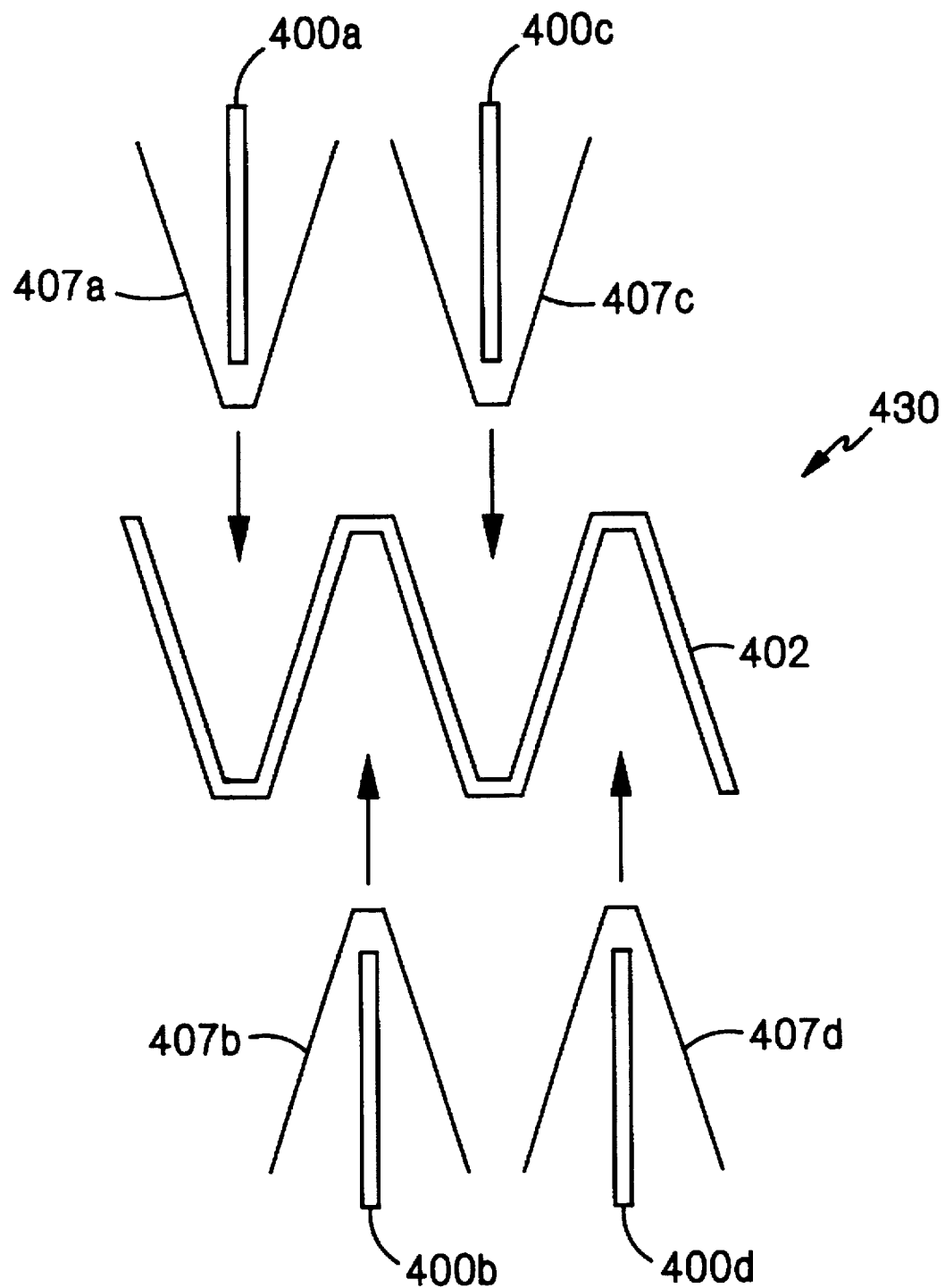
FIG. 13 shows a top view of a construction sequence for another version of the structure of FIG. 11.
Figure 14A:
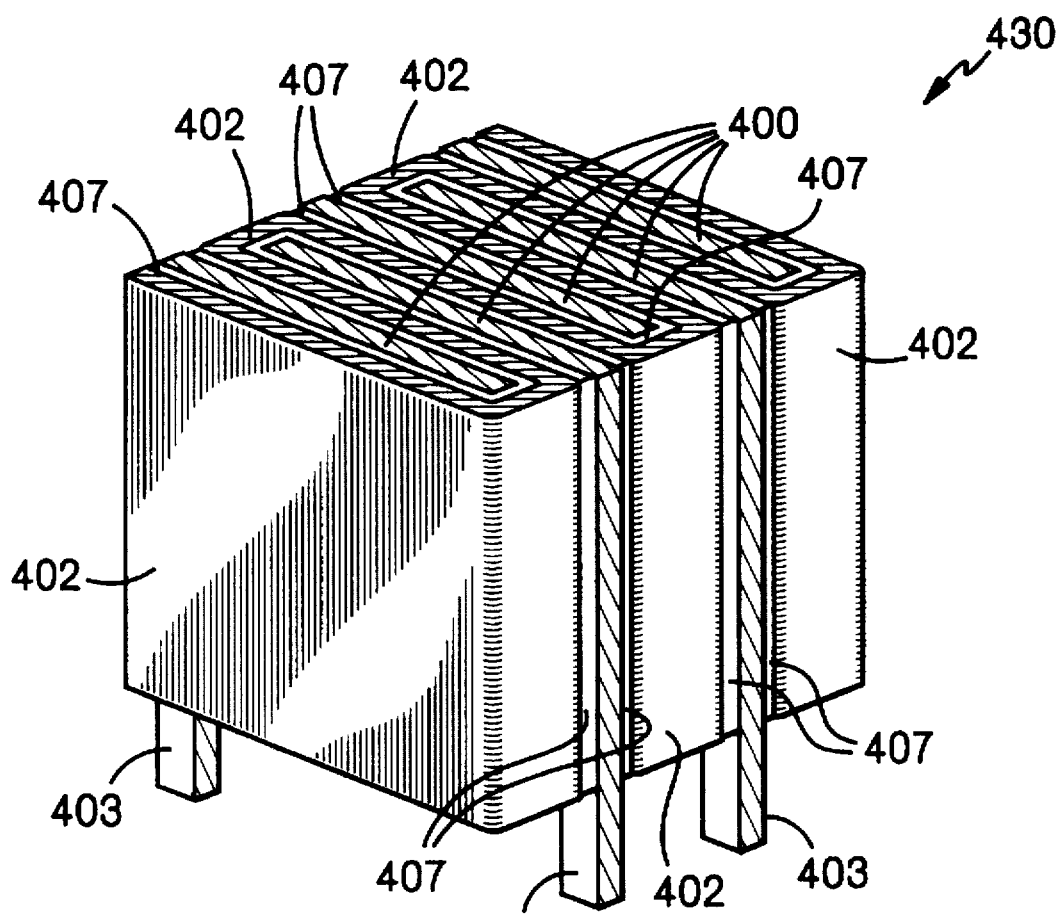
FIG. 14A shows a perspective view of the internal construction of a version of the structure of FIG. 13.
Figure 14B:
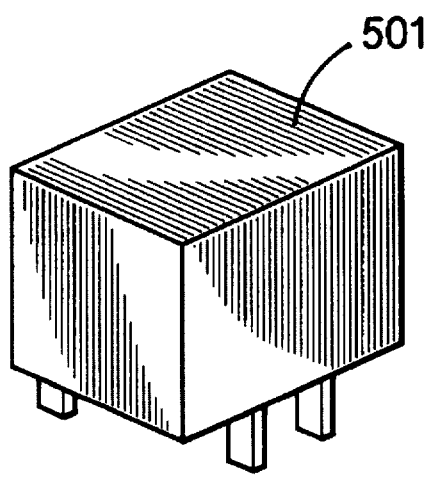
FIG. 14B shows a perspective view of a finished version of the structure shown in FIG. 14A.

FIG. 13 shows the internal construction of another embodiment 430 of the structure of FIG. 11. In FIG. 13, a first conductive tab 400a is inserted within an insulating sheet 407a. A conductive plate 402 is then folded such that the surfaces of the plate lie against the outer faces of the insulating sheet 407a. The process is repeated with additional tabs 400b, . . . , 400d and insulators 407a, . . . , 407d to form a complete assembly 430, as shown in FIG. 14A. As in the structure 425 of FIG. 11, extension legs 403, which form part of the tabs 400, are used to make electrical connections between the structure 430 and the input-output ports of converters. The structure is finished by applying an insulating medium 501 around the exterior surfaces (FIG. 14B). The port-to-port capacitance, Cb, is determined by the dielectric constant of the insulating sheets 405 and the area of overlap between the tabs and plate 400, 402.

Figure 15:
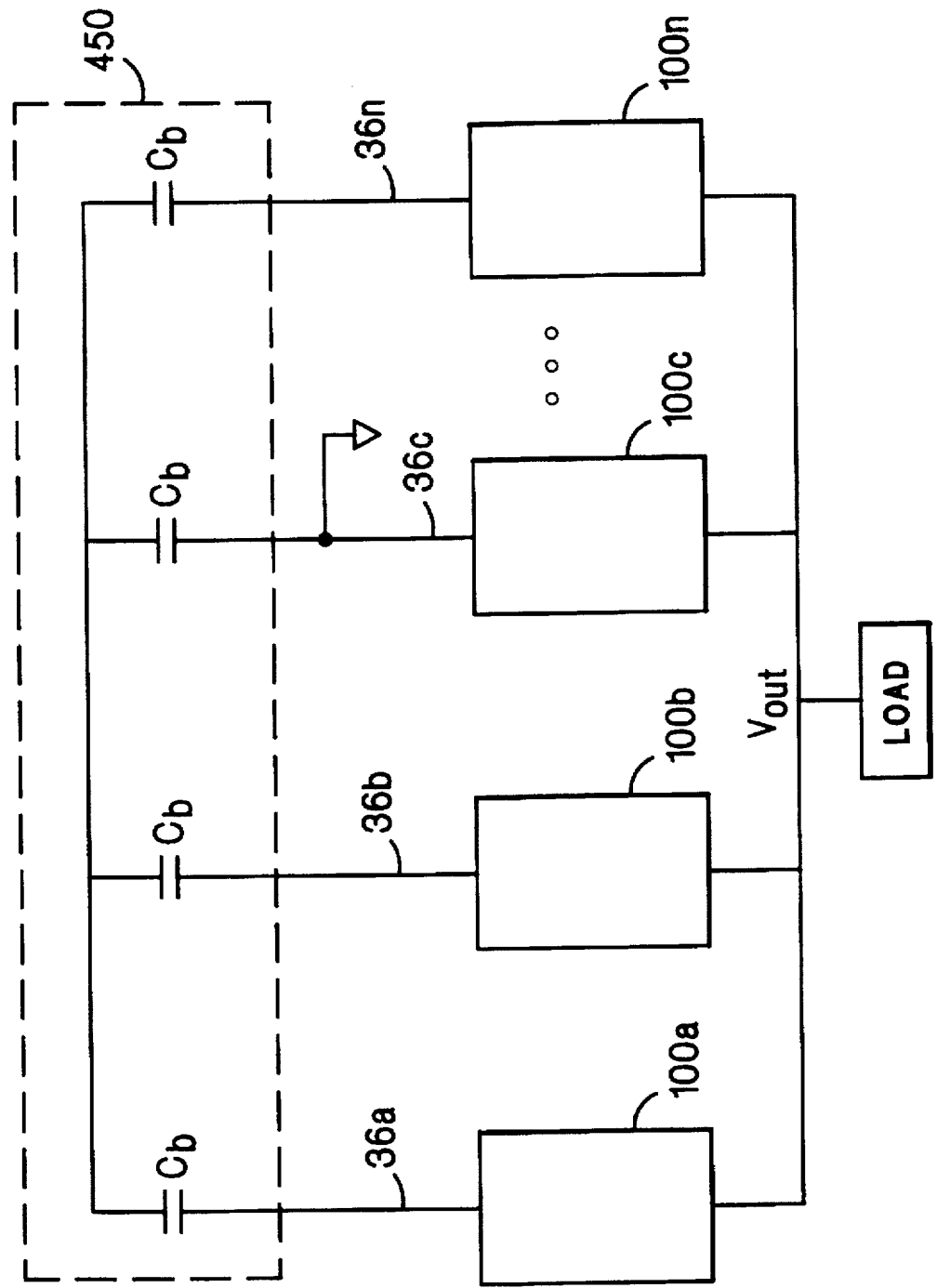
FIG. 15 shows an enhancement-mode array.

A benefit of capacitively coupled structures of the kind shown in FIGS. 11A, 12, and 14 is that the loading presented to the master converter by the synchronizing bus 450 when one input-output port in an array is shorted is independent of the size of the array. This is illustrated in FIG. 15, where the input-output port of converter 100c, in an array of N converters, is shorted to the input-output port return. Irrespective of which converter is the master, the synchronizing signal presented to the remainder of the converters is equal to one-half of the signal level generated by the master and the loading on the master is equal to Cb/2, where Cb is the value of the capacitances within the synchronizing bus.

Figure 11B:
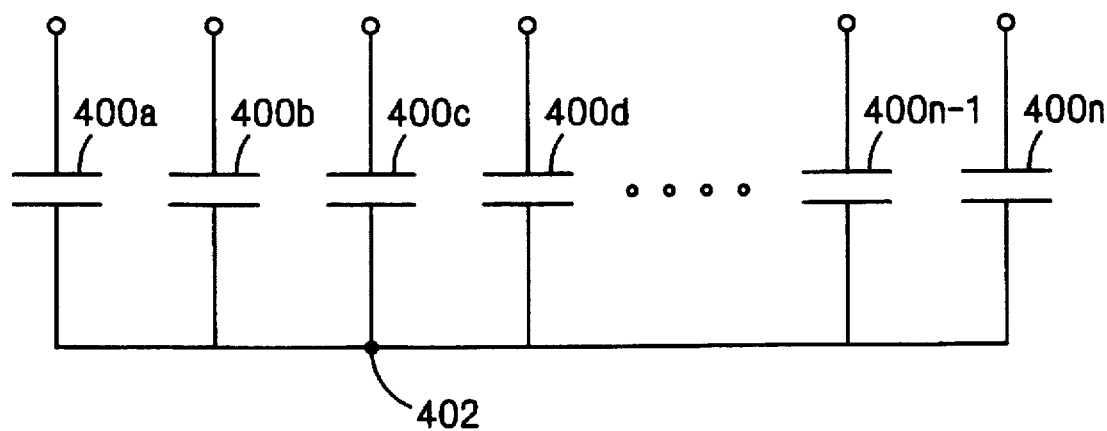
FIG. 11B is an equivalent circuit diagram.

The structures of FIGS. 11A, 12 and 13 all share the equivalent circuit of FIG. 11B, in which the plate 402 forms one terminal of each of the equivalent capacitors 400a, . . . , 400n. If this common connection point 402 were externally accessible (as it might be if, for example, a bus structure of the kind shown in FIG. 11B were configured using discrete capacitors inserted into a printed circuit board, or if a connection tab attached to the plate 402 in the structures of FIGS. 12 or 13 were made externally available) then there would exist the possibility that a single point failure (e.g., a short circuit of the plate 402 to a point which is referenced back to the input-output port returns) would cause array operation to be interrupted. A distinguishing feature of the pre-configured synchronizing bus structures of FIG. 12 and 13 is that the common conductive element 402 within each of them is enclosed within the structure and is not made externally accessible and therefore cannot become a single point for array failure.

For an array of N converters, the number of discrete capacitors required to construct the synchronizing buses of FIGS. 2, 5, and 11, are, respectively: N, N*(N−1)/2 and N capacitors.

Figure 16:
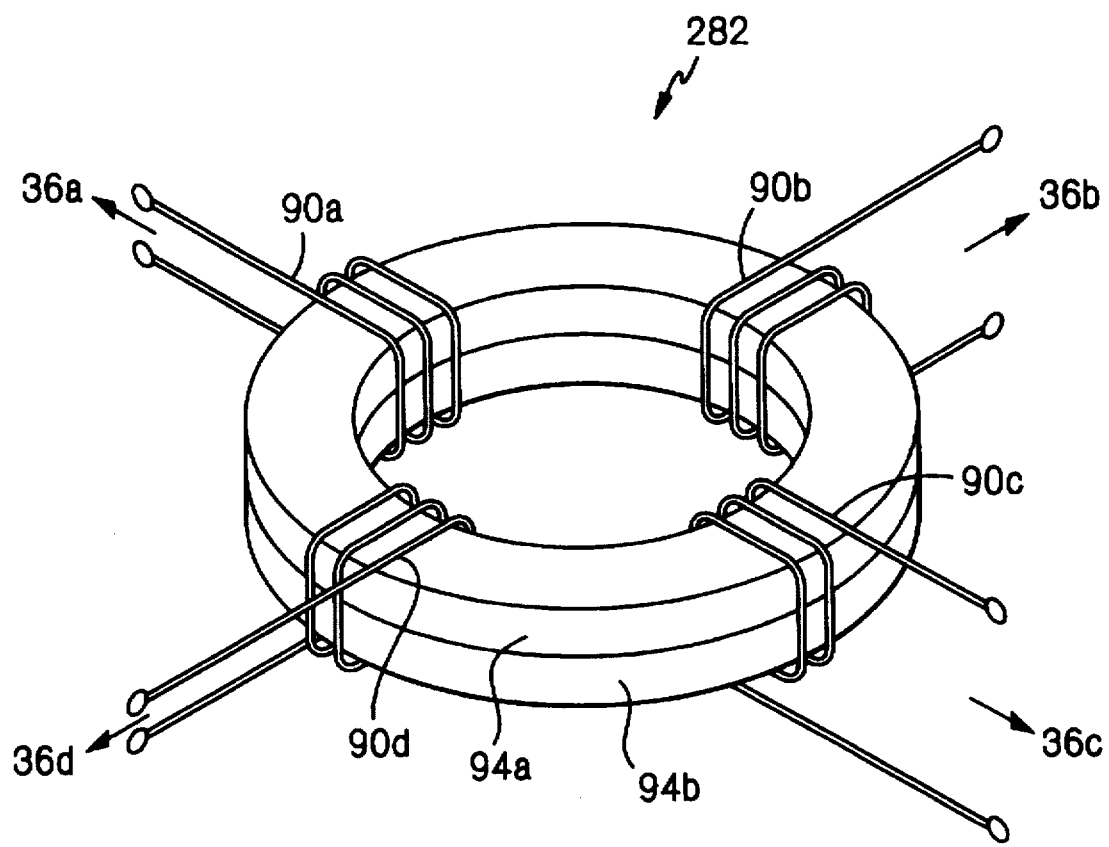
FIG. 16 shows a synchronizing bus of the kind shown in FIG. 7.

An example of a magnetically coupled synchronizing bus structure, of the kind shown in FIG. 7, is shown in FIG. 16. Windings 90a, . . . , 90d are linked by two stacked magnetic cores 94a, 94b to form a leakage inductance transformer. As indicated by the arrows, the windings are connected to input-output ports 36a, . . . , 36d of the converters. Two cores 94a, 94b are used for fault tolerance (e.g., a single core might be cracked in service). Although the drawing shows toroidal cores, other types of core structures might be used. For example, the cores might be pairs of U-cores and the windings might be wound on bobbins. Portions of the core might be covered with conductive material to provide a controlled amount of leakage inductance (see, for example, U.S. patent application Ser. No. 08/524,885, "High Frequency Circuit Having A Transformer With Controlled Interwinding Coupling and Controlled Leakage Inductances").

Pre-configured synchronizing bus assemblies, of the kinds shown in FIGS. 13, 14 and 16, will permit construction of arrays up to a certain size. Their monolithic construction offers convenience to the user in that there is only one part to handle and install (as opposed, for example, to many discrete capacitors) and the amount of space required (e.g., printed circuit board area) by the synchronizing bus is reduced.

Figure 17A:
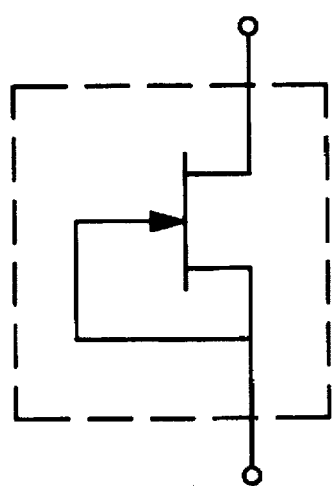
FIG. 17A and 17B show JFETs connected as unipolar and bipolar constant current sources, respectively.
Figure 17B:
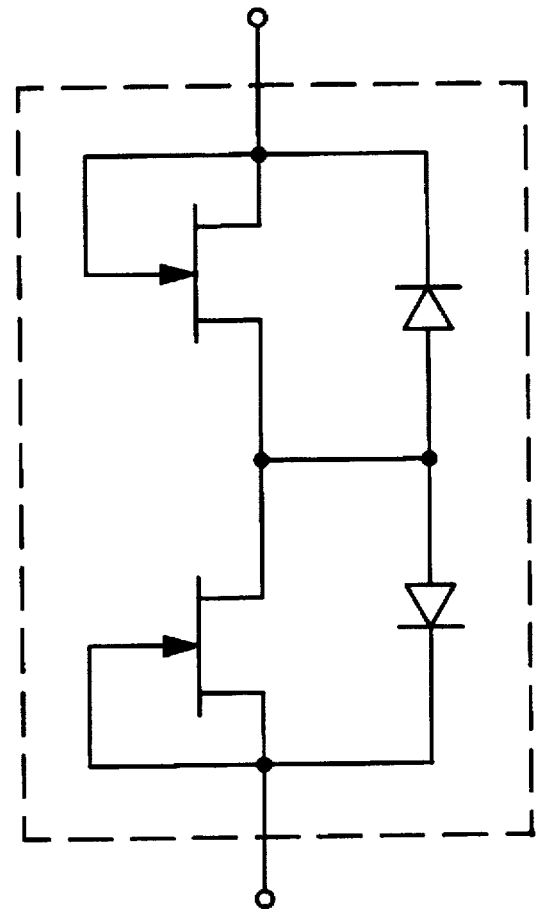
Figure 17C:
FIG. 17C shows a resistor.

Other embodiments are within the scope of the following claims. The converters used in arrays need not be enhancement-mode converters or zero-current switching converters, but might, for example, be any converter whose power output varies with variations in converter operating frequency. Both active and passive circuit elements, other than capacitors, can be used to construct synchronizing buses. For example resistors (FIG. 17C) can be used in place of the capacitors shown in the buses of FIGS. 4, 5, 11, and 15, as can JFETs, e.g., connected as bipolar "constant current" sources as shown in FIG. 17B. A simple unipolar JFET current source (FIG. 17A) can be used in place of the capacitors in the buses of FIGS. 11 and 15.

What is claimed is:

1. A power conversion array for delivering power to a load, said array comprising at least four power converters, each of said power converters comprising an output power port for connection to the load and a synchronization port for passing synchronization information, and a synchronization medium connected to the synchronization ports of the converters for carrying the synchronization information among the converters, the synchronization medium defining paths among the synchronization ports such that every synchronization port is connected to every other synchronization port by at least one path that does not include a connection to the synchronization port of any of the other converters.

2. The array of claim 1 in which the one path comprises a galvanically isolated region coupled by an electromagnetic field.

3. The array of claim 1 in which the one path includes impedance coupling.

4. The array of claim 3 in which the impedance coupling includes inductive coupling.

5. The array of claim 3 in which the impedance coupling includes impedances formed as an integrated device.

6. The array of claim 3 in which the impedance coupling comprises resistors.

7. The array of claim 3 in which the impedance coupling comprises active components.

8. The array of claim 3 in which the impedance coupling comprises JFETs.

9. The array of claim 3 in which the impedance coupling includes capacitive coupling.

10. The array of claim 9 in which the capacitive coupling in the one path comprises a capacitor.

11. The array of claim 9 in which the capacitive coupling comprises capacitors connecting each of the synchronization ports to every other synchronization port.

12. The array of claim 1 in which the paths comprise active components.

13. The array of claim 1 in which the synchronization ports of the converters are galvanically isolated from one another.

14. The array of claim 1 in which the synchronization medium comprises insulated conductors that are connected respectively to the synchronization ports of the power converters and are capacitively coupled to one another.

15. The array of claim 14 in which the conductors are wires twisted together.

16. The array of claim 1 in which the synchronization medium is connected to each of the ports using conductors which comprise windings and the paths include magnetic coupling.

17. The array of claim 16 in which the conductors enclose a magnetically permeable medium.

18. The array of claim 17 in which the medium comprises a permeable core.

19. The array of claim 17 in which the conductors and the permeable medium comprise a leakage inductance transformer.

20. The array of claim 17 in which the permeable medium comprises two stacked core pieces.

21. A power conversion array for delivering power to a load, said array comprising at least three power converters, each of said power converters comprising an output power port for connection to the load, and a synchronization port for passing synchronization information, and a synchronization medium for conveying synchronizing information via impedance elements connected to the synchronization ports by coupling conductors, the path between any pair of coupling conductors including exactly two impedance elements.

22. The array of claim 21 in which the two impedance elements comprise capacitive elements connected in series between the pair of ports.

23. The array of claim 21 in which the coupling conductors comprise a twisted bundle of insulated conductors.

24. The array of claim 21 in which the impedance elements comprise active components.

25. The array of claim 21 in which the impedance elements comprise capacitive elements.

26. The array of claim 25 in which the capacitive elements comprise metal tabs which are capacitively coupled to a single conductive element.

27. The array of claim 26 in which the single conductive element comprises a conductive plate.

28. The array of claim 26 in which the single conductive element is insulated from the environment.

29. The array of claim 25 in which the capacitive elements are formed by conductive plates associated respectively with the ports and a single common conductive element capacitively coupled to and shared by the conductive plates associated with the ports.

30. The array of claim 29 in which the common conductive element is insulated from the environment.

31. The array of claim 29 in which the common conductive element is folded.

32. The array of claim 1 or 21 in which the synchronization medium comprises one capacitor for each converter in the array, one terminal of each capacitor being a coupling conductor connected to a different synchronization port in the array, the other terminals of all of the capacitors being connected together.

33. The array of claim 1 or 21 in which the converters comprise zcs converters.

34. The array of claim 1 or 21 in which the converters comprise enhancement-mode converters.

35. The array of claim 1 or 21 in which the converters include regenerative synchronization circuitry.

36. The array of claim 1 or 21 in which the converters include talker-listener synchronization circuitry.

37. The array of claim 1 or 21 in which the synchronization medium comprises passive components.

38. The array of claim 1 or 21 in which the synchronization medium comprises resistors.

39. The array of claim 1 or 21 in which the synchronization medium comprises JFETs.

40. The array of claim 1 or 21 in which at least one of the converters is a booster converter.

* * * * *